(12) United States Patent
Williams

(10) Patent No.: US 8,235,860 B2
(45) Date of Patent: Aug. 7, 2012

(54) HYDRAULICALLY SHIFTED TWO-SPEED ON-DEMAND TRANSFER CASE

(75) Inventor: Randolph C. Williams, Weedsport, NY (US)

(73) Assignee: MAGNA Powertrain USA, Inc., Troy, MI (US)

( * ) Notice: Subject to any disclaimer, the term of this patent is extended or adjusted under 35 U.S.C. 154(b) by 182 days.

(21) Appl. No.: 12/747,258

(22) PCT Filed: Dec. 17, 2008

(86) PCT No.: PCT/US2008/087066
§ 371 (c)(1),
(2), (4) Date: Jun. 10, 2010

(87) PCT Pub. No.: WO2009/079527
PCT Pub. Date: Jun. 25, 2009

(65) Prior Publication Data
US 2011/0152026 A1 Jun. 23, 2011

(51) Int. Cl.
*F16H 3/44* (2006.01)
(52) U.S. Cl. .................................................. 475/299
(58) Field of Classification Search ............... 180/251
See application file for complete search history.

(56) References Cited

U.S. PATENT DOCUMENTS

| | | | |
|---|---|---|---|
| 1,514,872 A | 8/1921 | Starr | |
| 4,667,538 A | 5/1987 | Larsson | |
| 4,821,591 A * | 4/1989 | Adler | 74/339 |
| 4,976,671 A * | 12/1990 | Andersson | 475/299 |
| 6,079,535 A | 6/2000 | Mueller et al. | |
| 6,565,475 B2 | 5/2003 | Williams et al. | |
| 6,572,506 B2 | 6/2003 | Williams et al. | |
| 6,602,159 B1 * | 8/2003 | Williams | 475/303 |
| 6,645,110 B2 | 11/2003 | Williams et al. | |
| 6,878,088 B2 * | 4/2005 | Williams | 475/303 |
| 6,896,638 B2 * | 5/2005 | Nilsson | 475/299 |
| 7,189,179 B2 | 3/2007 | Williams et al. | |
| 7,254,471 B2 | 8/2007 | Allen et al. | |
| 2005/0023102 A1 | 2/2005 | Brissenden et al. | |
| 2005/0101429 A1 | 5/2005 | Allen et al. | |
| 2005/0277509 A1 | 12/2005 | Showalter | |
| 2006/0281597 A1 | 12/2006 | Williams et al. | |

\* cited by examiner

*Primary Examiner* — Dirk Wright
(74) *Attorney, Agent, or Firm* — Harness, Dickey & Pierce, P.L.C.

(57) ABSTRACT

A transfer case includes an input shaft, first and second output shafts, and a planetary gearset including a sun gear, a ring gear and planet gears rotatably supported on a carrier coupled to the first output shaft. A collar is driven by the sun gear and selectively drives the carrier. The ring gear is moveable between first and second positions. The collar is coupled to the ring gear for movement therewith between first and second positions. The collar is operable in its first position to couple the sun gear to the carrier and operable in its second position to be released from engagement with the carrier. The ring gear is operable in its first position to be released from coupled engagement with a stationary member and operable in its second position to be coupled to the stationary member. A mechanism moves the ring gear between its first and second positions.

20 Claims, 6 Drawing Sheets

HYDRAULICALLY SHIFTED TWO-SPEED ON-DEMAND TRANSFER CASE

BACKGROUND

The present disclosure generally relates to a power transfer system for controlling the distribution of drive torque between the front and rear drivelines of a four-wheel drive vehicle. More particularly, the present disclosure relates to an on-demand transfer case having a two-speed gear reduction unit, a range clutch for establishing high-range and low-range drive modes, and a mode clutch for controlling interaxle slip between the front and rear drivelines.

Due to growing consumer demand for four-wheel drive vehicles, many different power transfer systems are currently utilized for directing power (i.e., drive torque) to all four wheels of the vehicle. For example, in many "part-time" power transfer systems, a transfer case is installed between the front and rear drivelines and is normally operable in a two-wheel drive mode for delivering drive torque to the driven wheels. However, when the four-wheel drive mode is desired, a mode shift mechanism is selectively actuated by the vehicle operator for directly coupling the non-driven wheels to the driven wheels for establishing a part-time or locked four-wheel drive mode. One example of a part-time transfer case is disclosed in commonly-owned U.S. Pat. No. 4,770,280.

A significant number of the transfer cases discussed above are equipped with a gear reduction unit and a range shift mechanism operable for permitting the vehicle operator to choose between high-range and low-range drive modes. In many instances, the vehicle must be stopped before the transfer case can be shifted between its high-range and low-range drive modes. Unfortunately, the need to stop the vehicle prior to shifting between the high-range and low-range drive modes is inconvenient, particularly upon encountering road conditions or surface terrains where continuation of the vehicle's rolling momentum would assist in overcoming the conditions encountered. To alleviate this inconvenience, some two-speed transfer cases are equipped with a synchronized range shift mechanism from permitting "on-the-move" shifting between the high and low ranges.

It is also known to use "on-demand" power transfer systems for automatically directing power to the non-driven wheels, without any input or action on the part of the vehicle operator, when traction is lost at the driven wheels. Typically, the on-demand feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque to the non-driven wheels. The amount of drive torque transferred through the clutch assembly can be varied as a function of specific vehicle dynamics detected by the sensor arrangement. One example of an on-demand power transfer system is disclosed in commonly-owned U.S. Pat. No. 5,323,871.

SUMMARY

A transfer case includes an input shaft, first and second output shafts, and a planetary gearset. The planetary gearset includes a sun gear, a ring gear and a set of planet gears rotatably supported on a carrier that is coupled to the first output shaft. A collar is driven by the sun gear and selectively drives the carrier. The ring gear is moveable between a first position and a second position. The collar is coupled to the ring gear for movement therewith between first and second positions. The collar is operable in its first position to couple the sun gear to the carrier. The ring gear is operable in its first position to be released from coupled engagement with a stationary member. The collar is operable in its second position to be released from engagement with the carrier. The ring gear is operable in its second position to be coupled to the stationary member. A mechanism is operable to move the ring gear between its first and second positions.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
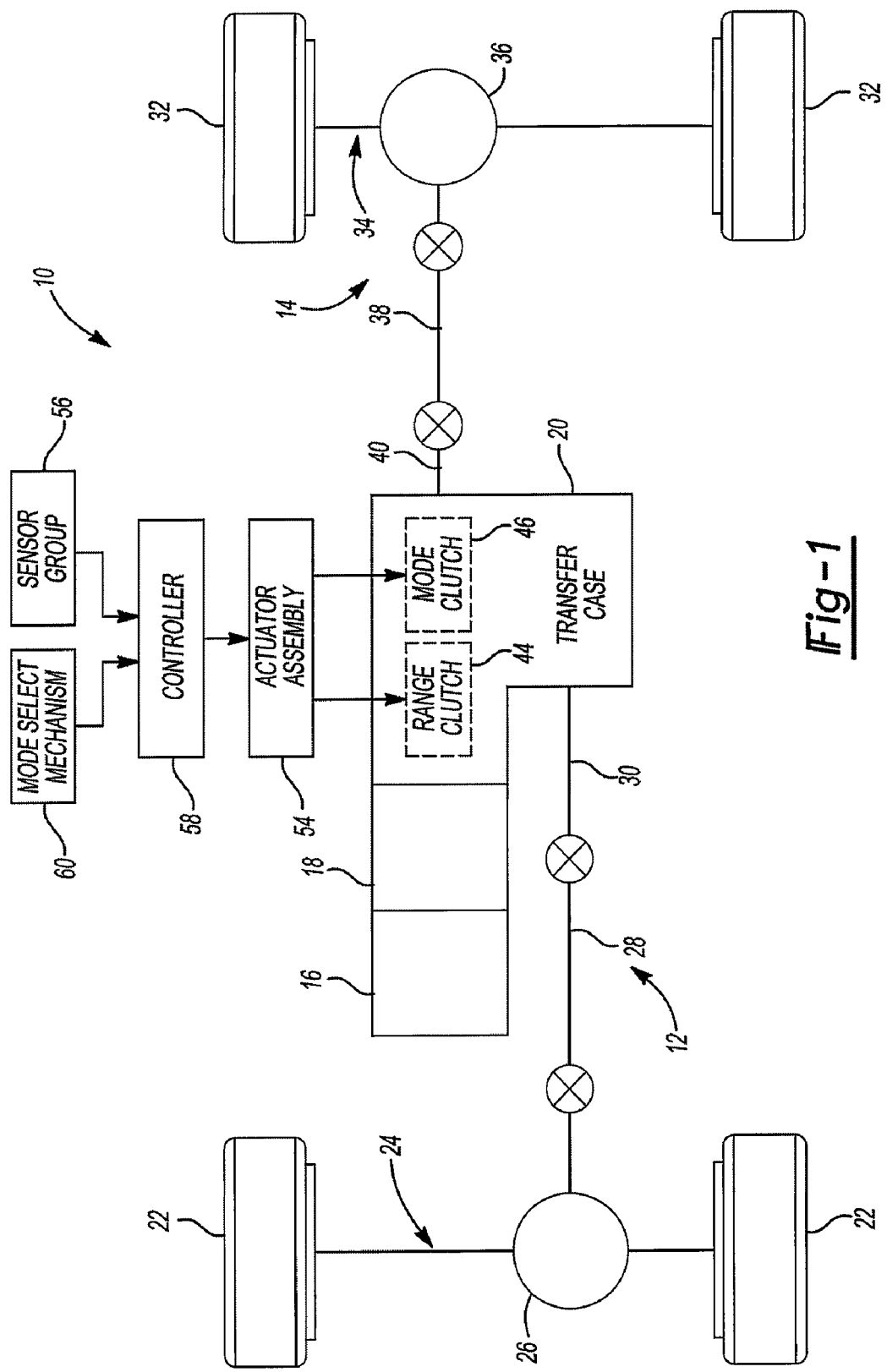
FIG. 1 is a schematic of an exemplary vehicle equipped with a transfer case constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both drivable from a source of power, such as an engine 16, through a transmission 18 which may be of the manual or automatic type. In the particular embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be detailed hereinafter with greater specificity, transfer case 20 is equipped with a planetary gearset 42, a range clutch 44, and a mode clutch 46. Range clutch 44 is operable to couple components of planetary gearset 42 for driving a carrier assembly 52 at either of a first (high-range) speed ratio or a second (low-range) speed ratio. In addition, carrier assembly 52 is coupled to rear output shaft 40 of transfer case 20. Mode clutch 46 is operable to control the magnitude of speed differentiation and torque transfer between rear output shaft 40 and front output shaft 30. Power transfer system 10 further includes a hydraulically powered actuator assembly 54 for controlling actuation of range clutch 44 and mode clutch 46, a sensor group 56 for sensing dynamic and operational characteristics of the motor vehicle and generating sensor input signals indicative thereof, and a controller 58 for generating control signals in response to the sensor input signals. Power transfer system 10 also includes a mode select mechanism 60 for permitting the vehicle operator to select one of the available drive modes. In particular, controller 58 functions to control actuation of actuator assembly 54 in response to the mode signal sent to controller 58 from mode select mechanism 60 that is indicative to the particular mode selected.

Figure 2:
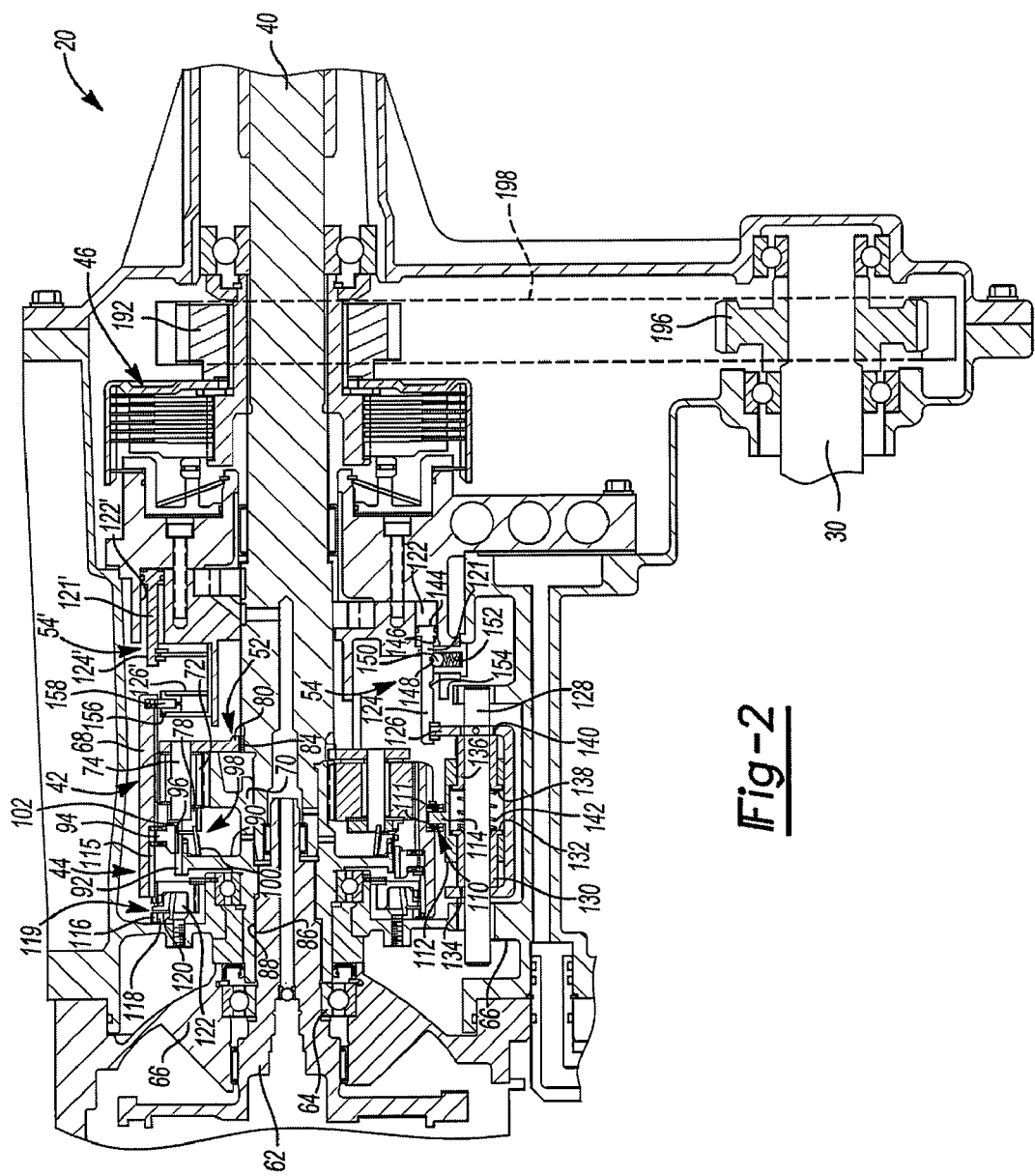
FIG. 2 is a fragmentary cross-sectional view of the transfer case depicted in FIG. 1.
Figure 3:
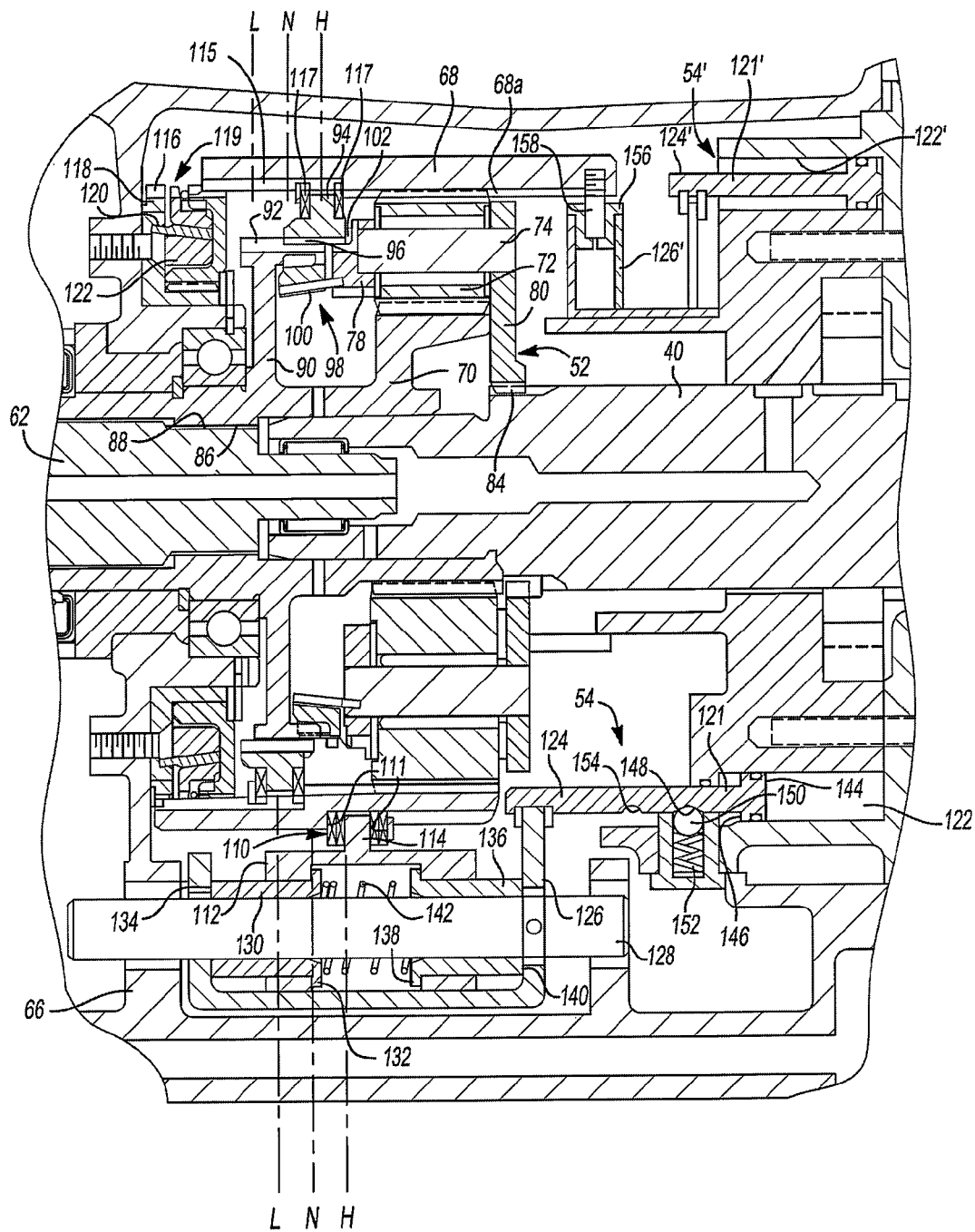
FIG. 3 is an enlarged fragmentary side view depicting a range clutch and a range clutch actuation mechanism of the transfer case.
Figure 4:
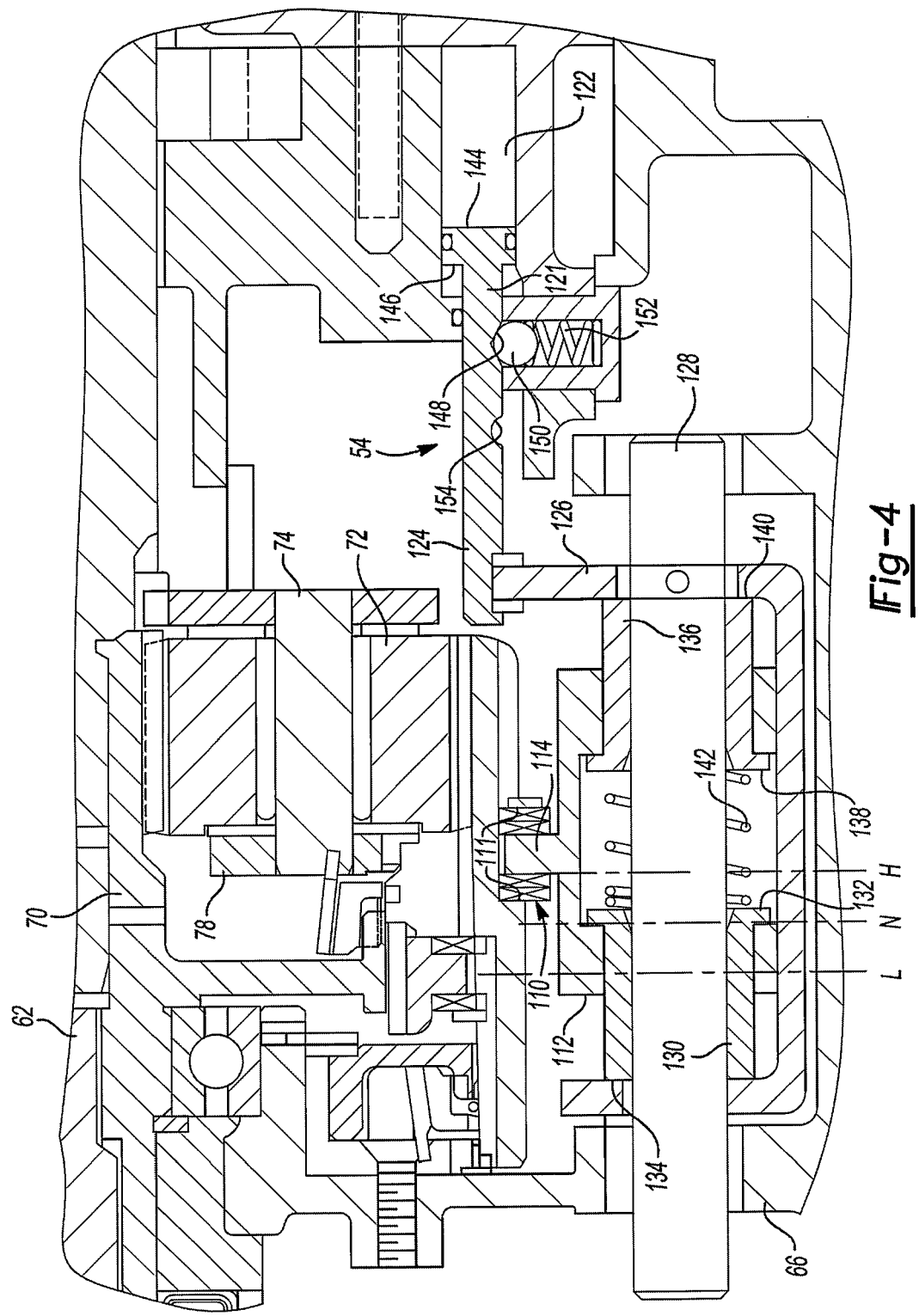
FIG. 4 is an enlarged fragmentary view of a range clutch actuator.

With particular reference now to FIGS. 2 through 4 of the drawings, transfer case 20 is shown to include an input shaft 62 rotatably supported by a bearing assembly 64 from a housing 66. Input shaft 62 is adapted for connection to an output shaft of transmission 18. Front output shaft 30 and rear output shaft 40 are also rotatably supported by housing 66. Planetary gearset 42 includes a ring gear 68, a sun gear 70, and a set of planet gears 72 each meshed with ring gear 68 and sun gear 70. Planet gears 72 are rotatably supported on pins 74 which extend between first and second carrier rings 78 and 80, respectively, of carrier assembly 52. Second carrier ring 80 is coupled via a splined connection 84 to rear output shaft 40. Sun gear 70 is shown fixed for rotation via a splined connection 86 with a shaft segment 88 of input shaft 62.

Sun gear 70 includes a radially extending hub 90 having external teeth 92. A collar 94 is axially fixed but rotatable relative to ring gear 68. Collar 94 includes internal teeth 96 in driving engagement with eternal teeth 92 of hub 90. Collar 94 is axially moveable concurrent with ring gear 68 relative to sun gear 70 and carrier assembly 52 between a first position (denoted by position line "H"), a second position (denoted by position line "L"), and a central or third position (denoted by position line "N"). When ring gear 68 and collar 94 are located in the H position, as shown in the upper-half of FIG. 3, hub 90 of sun gear 70 is coupled for common rotation with first carrier ring 78 via a first synchronizer 98. First synchronizer 98 includes a cone clutch assembly 100 positioned between collar 94 and first carrier ring 78. Axial translation of collar 94 is blocked until cone clutch assembly 100 causes the rotational speed of hub 90 to match the rotational speed of carrier assembly 52. Once speed synchronization is complete, collar 94 axially translates to drivingly engage external teeth 102 formed on first carrier ring 78. As such, sun gear 70 couples carrier assembly 52 for common rotation with input shaft 62, thereby establishing a direct drive ratio between input shaft 62 and rear output shaft 40. In contrast, collar 94 is released from engagement with clutch teeth 102 on first carrier ring 78 when ring gear 68 and collar 94 are located in the L position, as shown in the lower-half of FIG. 3, thereby allowing carrier assembly 52 to rotate at a slower speed than input shaft 62 to define a reduced ratio drive connection between input shaft 62 and rear output shaft 40.

Range clutch 44 is shown to include a range sleeve 110 that is fixed to or formed integrally with ring gear 68. Range sleeve 110 may be formed as a plurality of bearings 111 as shown. Thus, range sleeve 110 is also moveable between the high-range ("H") position, the low-range ("L") position, and the neutral ("N") position. In addition, a range fork 112 is provided which moves under the control of actuator assembly 54 to control axial movement of range sleeve 110 between its three range positions. Range fork 112 has a fork segment 114 retained in a groove formed in range sleeve 110. As will be detailed, actuator assembly 54 includes a drive mechanism which functions to move range fork 112 so as to cause axial movement of range sleeve 110 for establishing the different drive connections between input shaft 62 and carrier assembly 52. The force required to establish the different drive connections is minimized by forming first synchronizer 98 to include cone clutch assembly 100 with a relatively large diameter. Lower shift efforts allow the use of plastic materials for some or all of the components of first synchronizer 98 and range clutch 44.

The direct or high-range drive connection is established between input shaft 62 and rear output shaft 40 when range sleeve 110 is in its H position. With range sleeve 110 in its H position, ring gear 68 and collar 94 are located such that external clutch teeth 102 on first carrier ring 78 engage internal clutch teeth 96 on collar 94. Thus, sun gear 70 and carrier assembly 52 are commonly driven by input shaft 62. This establishes a direct speed ratio drive connection between input shaft 62 and carrier assembly 52 such that planet gears 72 do not rotate during operation of transfer case 20 in the high-range mode. This is a significant advantage over conventional two-speed planetary units since it eliminates a possible source of noise, vibration and harshness provided by planet gears 72 during the high-range mode of operation. It should also be appreciated that collar 94 is not drivingly connected to ring gear 68 but may rotate relative thereto. As such, power flows from hub 90 of sun gear 70 through collar 94, first carrier ring 78, pins 74, and second carrier ring 80 to rear output shaft 40. A driving load does not exist between the gear teeth of sun gear 70, planet gear 72 and ring gear 68. Accordingly, undue brinelling and/or fretting of the gear teeth of the planetary gearset gears are avoided by not transferring load through a locked planetary gearset.

Ring gear 68 may be constructed as a forging having internal clutch teeth 115 formed during the forging process. A set of ring gear teeth 68a may be helically shaped and formed using a broach. The planet gears 72 and sun gear 70 may also be helical gears to reduce the noise possibly generated by planetary gearset 42. Other methods of gear manufacture and gear shape are also contemplated as being within the scope of the present disclosure.

The reduced or low-range drive connection is established between input shaft 62 and rear output shaft 40 when range sleeve 110 is in its L position. With range sleeve 110 in its L position, internal clutch teeth 115 formed on ring gear 68 are engaged with clutch teeth 116 formed on a clutch plate 118 that is fixed to housing 66 such that ring gear 68 is braked against rotation. A second synchronizer 119 is positioned between clutch plate 118 and ring gear 68 to selectively couple/release ring gear 68 and clutch plate 118. Second synchronizer 119 includes a cone clutch assembly 120 positioned between slidable ring gear 68 and clutch plate 118. As synchronizer 119 is engaged, cone clutch assembly 120 causes the rotational speed of ring gear 68 to match clutch plate 118. Once speed synchronization is complete, ring gear 68 may continue to axially translate to drivingly engage clutch teeth 115 with clutch 116 formed on clutch plate 118. In addition, this movement causes collar 94 to slide axially to a position whereat its clutch teeth 96 are disengaged from clutch teeth 102 on first carrier ring 78. As such, driven rotation of input shaft 62 drives sun gear 70 such that carrier assembly 52 is driven at a reduced speed due to ring gear 68 being braked. While the low-range ratio is being provided, sleeve 94 rotates relative to ring gear 68. A pair of thrust bearings 117 are positioned to minimize any frictional loss during this mode of operation.

A neutral (non-driven) mode is established when range sleeve 110 is in its N position. With range sleeve 110 in its N position, collar 94 is axially moved to disengage clutch teeth 96 from clutch teeth 102 on first carrier ring 78. As such, sun gear 70 is released from carrier assembly 52. Additionally, ring gear 68 is axially positioned to disengage clutch teeth 115 from clutch teeth 116 formed on clutch plate 118. Therefore, ring gear 68 is released from housing 66 such that no drive torque is delivered from input shaft 62 to rear output shaft 40 through carrier assembly 52.

The bottom half of FIG. 3 and FIG. 4 depict actuator assembly 54 being operable to apply a force to range fork 112 to cause a range shift. Actuator assembly 54 includes a piston 121 slidably movable within a cavity 122. One end of piston 121 is shaped as a rod 124 coupled to a cradle 126. A shift rail 128 is fixed to cradle 126 and slidably supported at each of its ends by housing 66. A first sleeve 130 is slidably positioned on shift rail 128 and includes a flanged head 132 in engagement with range fork 112. An end face 134 of first sleeve 130 is in engagement with cradle 126. A second sleeve 136 is slidably supported on shift rail 128, includes a flanged head 138 in engagement with range fork 112 and an end face 140 biased into contact with cradle 126 by a spring 142. Actuator assembly 54 is operated by selectively supplying pressurized fluid to cavity 122 to act on one of a first surface 144 or a second surface 146 of piston 121. Depending on which piston surface receives a greater fluid pressure, piston 121 will be axially displaced in the appropriate direction. Concurrent translation of cradle 126 and shift rail 128 occur. A load from spring 142 is imparted to range fork 112. Once second synchronizer 119 matches the rotational speed of ring gear 68 and clutch plate 118, range fork 112, range sleeve 110 and ring 68 axially translate to engage teeth 115 with teeth 116.

When opposite surface 146 of piston 121 receives pressurized fluid, piston 121, cradle 126, shift rail 128, range fork 112, range sleeve 110 and ring gear 68 translate in the opposite direction. A first detent 148 is formed in rod 124 and in receipt of a ball 150 when range clutch 44 is in the L position. A spring 152 biasedly engages ball 150 within first detent 148. A second detent 154 is formed in rod 124. The position of second detent 154 is such that ball 150 is positioned within detent 154 when range clutch 44 is in the H position. Once ball 150 is positioned within one of first and second detents 148, 154, range clutch 44 tends to stay in the respective L or H position. Pressurized fluid is supplied to cavity 122 to move piston 121 from one of these positions.

Figure 5:
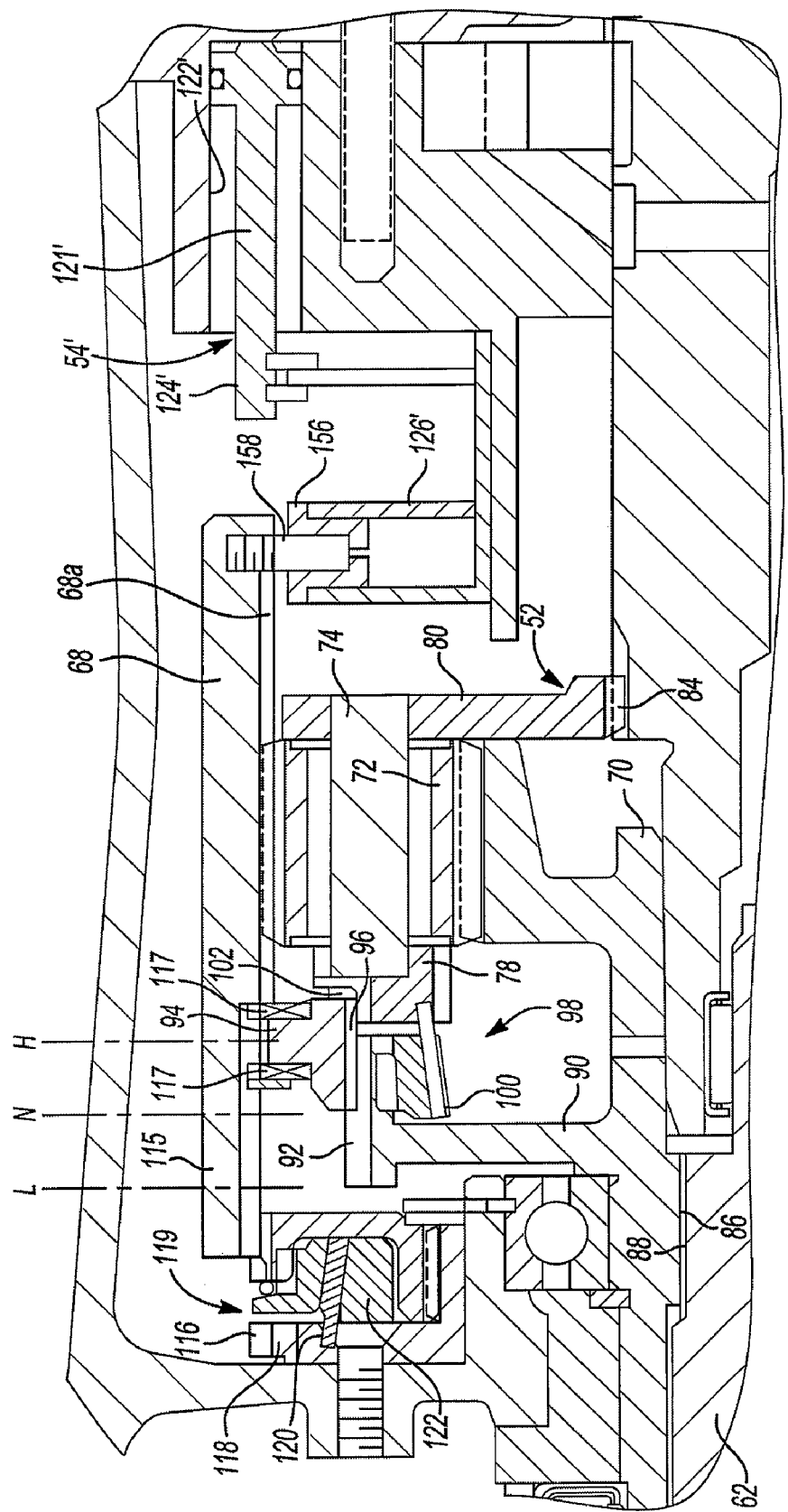
FIG. 5 is a fragmentary cross-sectional view of an alternate range clutch actuator.

With reference to the upper half of FIG. 3 and FIG. 5, an alternate actuator assembly 54' is shown. Actuator assembly 54' functions substantially similarly to actuator assembly 54. Actuator assembly 54' includes a piston 121' slidably positioned within a cavity 122'. A rod portion 124' of piston 121' is coupled to a cradle 126'. An actuator sleeve 156 is in receipt of a rod 158 mounted to ring gear 68. Rod 158 is free to rotate relative to actuator sleeve 156. Axial translation of piston 121 also translates cradle 126', actuator sleeve 156, rod 158 and ring gear 68. Because actuator assembly 54 is positioned adjacent to an outer surface of ring gear 68, an overall length of transfer case 20 is less than a length of a transfer case equipped with actuator assembly 54'. However, it is contemplated that the overall length of transfer case 20 is shorter than previously known transfer cases regardless of the configuration of actuator assembly 54 used.

Figure 6:
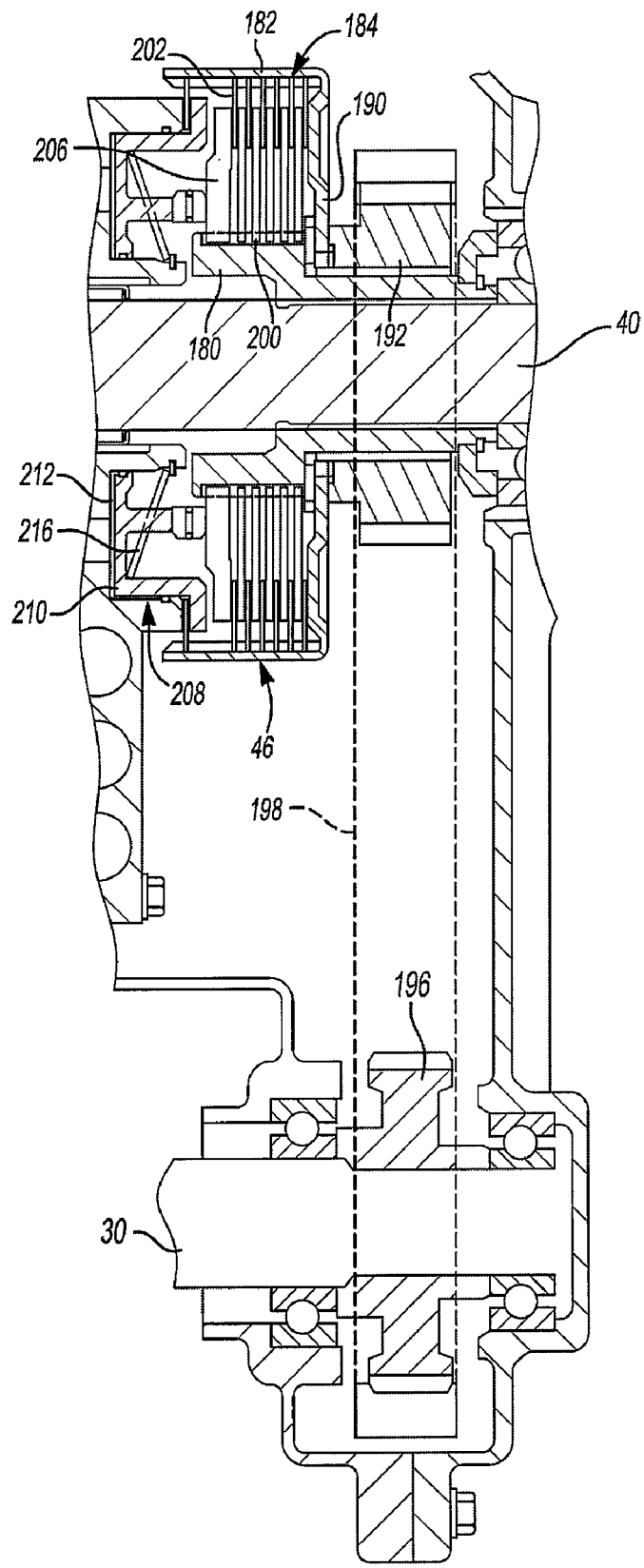
FIG. 6 is an enlarged fragmentary sectional view of a mode clutch and a mode clutch actuation mechanism of the transfer case.

As best seen from FIG. 6, mode clutch 46 is arranged to control slip and torque transfer between rear output shaft 40 and front output shaft 30. As such, mode clutch 46 may be controlled to operate in a four-wheel locked mode where speed differentiation between rear output shaft 40 and front output shaft 30 is prevented or in an on-demand mode. In the on-demand mode, mode clutch 46 may be adaptively controlled to vary the torque transferred to front output shaft 30.

Mode clutch 46 is a multi-plate friction clutch assembly which includes a clutch hub 180 that is fixed to rear output shaft 40, a clutch drum 182, and a clutch pack 184 disposed therebetween. Clutch drum 182 has a plate segment 190 that is splined on rear output shaft 40. A drive sprocket 192 is also splined to rear output shaft 40. Drive sprocket 192 drives a driven sprocket 196 that is fixed to front output shaft 30 via a power chain 198.

Clutch pack 184 includes a set of inner friction plates 200 splined to clutch hub 180 and which are interleaved with a set of outer friction plates 202 splined to drum 182. Clutch pack 184 is located between the plate segment 190 of drum 182 and an apply plate 206 that is splined to clutch hub 180. As will be detailed, movement of apply plate 206 relative to clutch pack 184 functions to vary the compressive engagement force exerted thereon for adaptively regulating the torque transferred from rear output shaft 40 to front output shaft 30.

Mode clutch 46 further includes a clutch actuation mechanism 208 for moving apply plate 206 under the control of actuation assembly 54. Mechanism 208 includes a piston 210 slidably positioned within a cavity 212 formed in housing 66, and a return spring 216 having one end fixed to housing 66 and an opposite end acting on piston 210. Application of pressurized fluid on piston 210 causes axial movement of apply plate 206 between a fully-retracted position and a fully-extended position to exert a clutch engagement force on inner and outer friction plates 200, 202 that varies between predetermined minimum and maximum values.

More particularly, upon selection of the locked four-wheel high-range drive mode, the neutral mode, or the locked four-wheel low-range drive mode, piston 210 is acted upon by a predefined pressure associated with each mode. However, when either of the on-demand four-wheel high-range or low-range drive modes are selected, power transfer system 10 is operable for modulating the clutch engagement force applied to clutch pack 184 of mode clutch 46 as a function of the various sensor input signals.

Mode select mechanism 60 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode select mechanism 60 offers the vehicle operator the option of deliberately choosing between the various operative drive modes.

When the locked four-wheel high-range drive mode is selected, range sleeve 110 is moved to its H position and piston 210 is moved to a position whereat apply plate 206 is in its fully extended position. Pressurized fluid acts on piston 210 to exert a clutch engagement force on clutch pack 184 to restrict relative movement between clutch hub 180 and clutch drum 182. Mode clutch 46 is considered to be operating in a fully actuated (locked-up) condition. Thus, speed differentiation between rear output shaft 40 and front output shaft 30 is prevented.

If mode select mechanism 60 thereafter signals selection of the on-demand four-wheel high-range drive mode, a minimum pressure is supplied to piston 210. Return spring 216 causes piston 210 to move to its fully retracted position while range sleeve 110 is maintained in its H position. As such, the minimum clutch engagement force is exerted on clutch pack 184 such that mode clutch 46 is considered to be in a non-actuated condition. Thereafter, mode clutch 46 provides adaptive control of the torque transferred across clutch pack 184. Specifically, the pressure provided to piston 210 may be continuously monitored and modulated in accordance with specific predefined relationships based on the current value of the sensor input signals.

Planetary gearset 42 is arranged to provide a ratio of between 2.6:1 to 4:1 for its low-range. In one example, planetary gearset 42 establishes a ratio of about 2.6:1 when sun gear 70 has 55 teeth, ring gear 68 has 89 teeth, and planet gears 72 each have 17 teeth. Alternately, planetary gearset 42 can have a sun gear 70' with 31 teeth while ring gear 68 has 89 teeth and first planet gears 72' each have 29 teeth for defining a 3.9:1 low-range ratio. As such, a common ring gear 68 and carrier assembly 52 may be used to create a number of different planetary gearsets 42 having different low-range ratios. The alternate planet gears 72' are mounted at different locations within carrier assembly 52 to account for the diameter difference. The use of common components reduces the cost of providing various low-range ratios. Other planetary gearset ratios may be provided by constructing various gear combinations to provide a number of modules that may be installed within transfer case 20.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A transfer case comprising:
an input shaft;
first and second output shafts;
a planetary gearset being driven by said input shaft and including a sun gear, a ring gear, and a set of planet gears rotatably supported on a carrier that is coupled to said first output shaft;
a collar driven by said sun gear and selectively driving said carrier, said ring gear being moveable between a first position and a second position, said collar coupled to said ring gear for movement therewith between first and second positions, said collar being operable in its first position to couple said sun gear to said carrier, said ring gear being operable in its first position to be released from coupled engagement with a stationary member, said collar being operable in its second position to be released from engagement with said carrier, said ring gear being operable in its second position to be coupled to said stationary member; and
a mechanism to move said ring gear between its first and second positions.

2. The transfer case of claim 1 wherein said mechanism to move said ring gear includes a piston slidably positioned within a cavity being acted on by pressurized fluid.

3. The transfer case of claim 2 wherein said mechanism to move said ring gear further includes an axially moveable range fork coupled to said ring gear.

4. The transfer case of claim 3 wherein said range fork is driven by a carriage coupled to said piston.

5. The transfer case of claim 4 further including a spring operable to apply a force to said range fork based on movement of said carriage.

6. The transfer case of claim 1 wherein said collar is rotatable relative to said ring gear.

7. The transfer case of claim 6 wherein said collar is splined for rotation with and axially moveable relative to said sun gear in response to movement of said ring gear.

8. The transfer case of claim 1 further including a mode clutch operably disposed between said first and second output shafts and which is normally operable to permit speed differentiation between said output shafts, said mode clutch being further operable for limiting speed differentiation between said output shafts.

9. The transfer case of claim 8 wherein said mode clutch is a multi-plate clutch assembly having a set of first clutch plates fixed for rotation with said first output shaft and which are interleaved with a set of second clutch plates fixed for rotation with a drive sprocket driving said second output shaft, and a mode clutch actuation mechanism including a piston being acted on by pressurized fluid to apply a force to said multi-plate clutch assembly and transfer drive torque from said first output shaft to said second output shaft.

10. The transfer case of claim 1 further including a first synchronizer operably disposed between said carrier and said sun gear for inhibiting movement of said collar to its first position until speed synchronization is established, and a second synchronizer operably disposed between a stationary member and said ring gear for inhibiting movement of said ring gear to its second position until speed synchronization is established therebetween.

11. The transfer case of claim 1 wherein said collar includes teeth adapted to engage teeth on said carrier when said collar is moved to its first position.

12. The transfer case of claim 1 wherein said ring gear includes teeth adapted to engage teeth on said stationary member in response to movement to its second position.

13. A transfer case comprising:
an input shaft;
first and second output shafts;
a planetary gearset interconnecting said input shaft to said first output shaft and including a sun gear driven by said input shaft, a ring gear, and a set of planet gears supported by a carrier assembly and meshed with said sun gear and said ring gear, said carrier assembly driving said first output shaft;
a collar being fixed for rotation with and axially moveable relative to said sun gear between a first position and a second position, said collar being axially fixed to and rotatable relative to said ring gear;
said ring gear being moveable between a first position and a second position, said sun gear being coupled to said carrier assembly when said collar is located in its first position, said sun gear being permitted to rotate relative to said carrier assembly when said collar is located in its second position;
a first clutch plate fixed to said carrier assembly;
a second clutch plate fixed to a stationary member; and
a shift mechanism to move said ring gear between its first and second positions to establish high-range and low-range drive connections between said input shaft and said carrier assembly, said high-range connection being established when said ring gear is in its first position whereat said sun gear is coupled to said first clutch plate and said ring gear is released from said second clutch plate, said low-range drive connection being established when said ring gear is in its second position whereat said ring gear is coupled to said second clutch plate and said sun gear is released from said first clutch plate.

14. The transfer case of claim 13 wherein said mechanism to move said ring gear includes a piston slidably positioned within a cavity being acted on by pressurized fluid.

15. The transfer case of claim 14 wherein said mechanism to move said ring gear further includes an axially moveable range fork coupled to said ring gear.

16. The transfer case of claim 15 further including a mode clutch operably disposed between said first and second output shafts and which is normally operable to permit speed differentiation between said output shafts, said mode clutch being further operable for limiting speed differentiation between said output shafts.

17. The transfer case of claim 16 wherein said mode clutch is a multi-plate clutch assembly having a set of first clutch plates fixed for rotation with said first output shaft and which are interleaved with a set of second clutch plates fixed for rotation with a drive sprocket driving said second output shaft, and a mode clutch actuation mechanism including a piston being acted on by pressurized fluid to apply a force to said multi-plate clutch assembly and transfer drive torque from said first output shaft to said second output shaft.

18. The transfer case of claim 17 further including a driven sprocket fixed for rotation with said second output shaft and a chain drivingly interconnecting said drive sprocket and said driven sprocket.

19. The transfer case of claim 13 further including a first synchronizer operably disposed between said carrier and said sun gear for inhibiting movement of said collar to its first position until speed synchronization is established, and a second synchronizer operably disposed between a stationary member and said ring gear for inhibiting movement of said ring gear to its second position until speed synchronization is established therebetween.

20. The transfer case of claim 13 wherein said shift mechanism includes a rod fixed to said ring, said rod being rotatably captured within an actuator sleeve.

* * * * *